T. WEBER.
COUPLING.
APPLICATION FILED JULY 6, 1921.

1,411,230.

Patented Mar. 28, 1922.

INVENTOR.
Tobias Weber
BY Nestall and Wallace
ATTORNEYS.

UNITED STATES PATENT OFFICE.

TOBIAS WEBER, OF LOS ANGELES, CALIFORNIA.

COUPLING.

1,411,230.  Specification of Letters Patent.  Patented Mar. 28, 1922.

Application filed July 6, 1921. Serial No. 482,683.

*To all whom it may concern:*

Be it known that I, TOBIAS WEBER, a citizen of the United States, and resident of Los Angeles, in the county of Los Angeles, State of California, have invented new and useful Improvements in a Coupling, of which the following is a specification.

This invention relates to a coupling adapted to connect trailers. It is usual to provide trailers at their front ends with draw-bars having eyes and at the rear thereof with hooks with which the draw-bar of the following trailer may be engaged. Likewise, the rear of the tractor is provided with a hook. It is the primary object of this invention to provide the hook with a guard of novel construction to prevent disengagement of the hook and eye, and, furthermore, to provide details of structure, whereby the guard is positively held in open and closed positions as desired.

Figure 1:
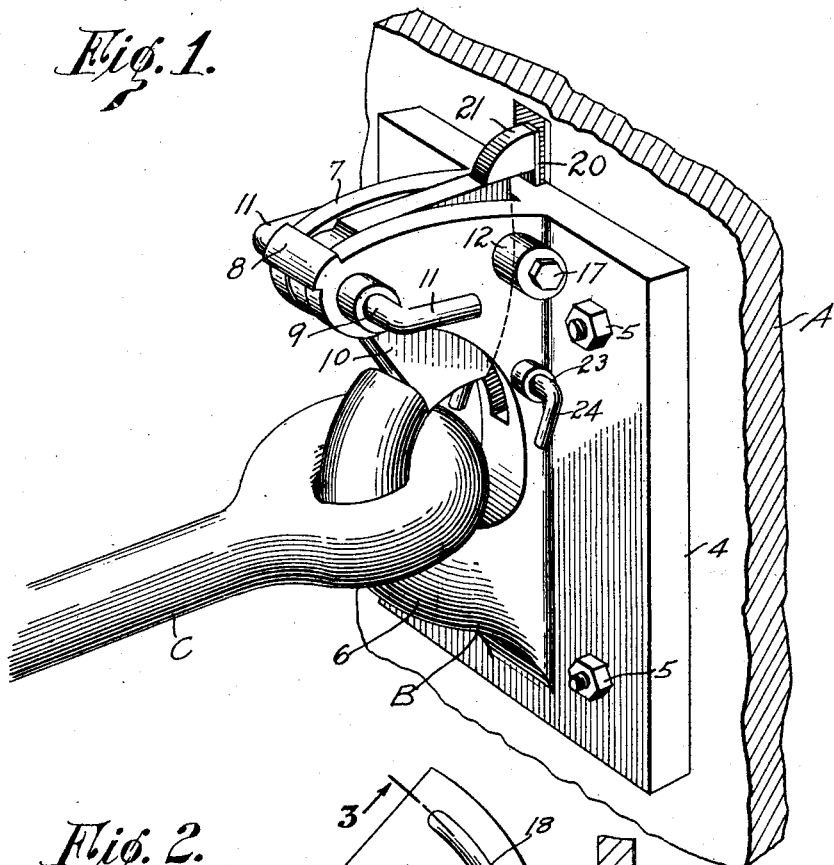
Figure 2:
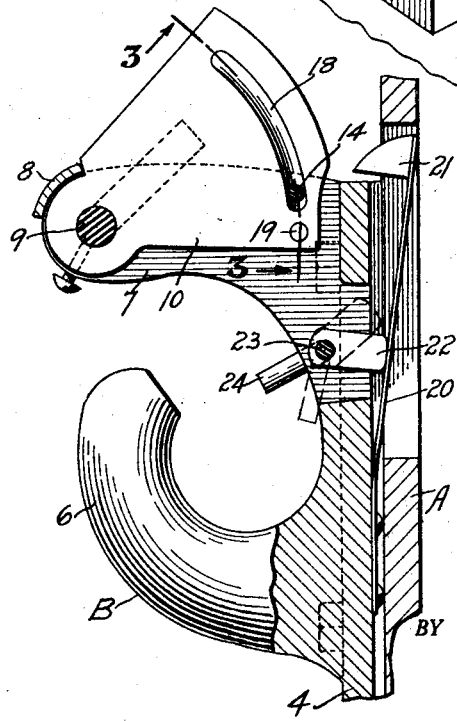
Figure 3:
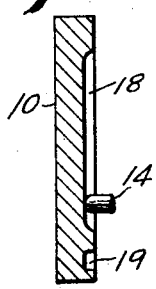

These objects will be more fully understood from the following detailed description of a preferred embodiment of my invention. For the purpose of this description, reference is had to the accompanying drawing, in which:

Fig. 1 is a perspective view of a hook and a fragment of a draw-bar; Fig. 2 is a vertical central section through the hook; and Fig. 3 is a section as seen on the line 3—3 of Fig. 2.

Referring more particularly to Figs. 1 and 2, a fragment of the rear of an automobile is indicated by A. Secured thereto is the hook B, to which a draw-bar C attached to the front end of a vehicle is secured.

Referring more especially to the hook, it comprises a base plate 4 for attachment to the body or frame by means of bolts 5 or other suitable means. Formed on the base plate and outstanding therefrom is a hook 6. Overhanging the hook is a bifurcated bracket portion 7 serving as a mounting for the guard. A stop 8 bridges the arm of the bracket and serves to limit the movement of the hook. The forward end of the bracket has a bearing formed therein for the reception of a pivot shaft 9, to which a guard 10 is fixed. This guard is of fan shape and is mounted between the arms of the bracket so as to swing freely therein. The weight of the guard is so distributed that when the coupling is in a vertical position, as shown, it will tend to swing downwardly and close the mouth of the hook.

For convenient operation of the guard in opening the hook to release the draw-bar, the shaft 9 has lateral extensions 11 at its ends forming a handle convenient for grasping and lifting the guard. They are also disposed in such a position that their weight assists in keeping the guard closed by gravity.

Formed on one of the arms of the bracket is a boss 12 having a spring pressed detent pin 14 disposed therein and held in position by a plug 17 closing the bore.

Formed on one side of the guard is an arcuate channel 18 of such length that the detent pin 14 will be disposed therein when the guard closes the hook and when it is opened with its lower edge in alinement with the lower edge of the hook bracket. This position is obtained when the guard is forced inwardly by pressing upon its lower edge. The channel is of such depth that pin 14 in its outermost position will not engage the wall thereof. Thus, the guard is free to swing from open to closed position without any resistance from the detent pin. Beyond the lower edge of the channel 18 is a recess 19 disposed to receive the detent pin when the lower outer edge of the guard is swung beyond the mouth of the hook.

In order to hold the guard positively in closed position, I have mounted upon the back of the base a leaf spring 20, to the upper end of which is secured a catch 21. The catch 21 is so arranged that it will normally press forward and overhang the guard, as shown in Fig. 1. In this position it securely locks the guard against accidental displacement. For convenient manipulation of the catch 21 to release the guard, I have pivotally mounted in the hook an arm 22, which may be forced against the spring 20, as shown in Fig. 2, to move the catch out of engagement with the guard. The arm 22 is fixed to a shaft 23 having the ends bent to form handles 24. By grasping a handle 24 and pulling it upwardly, arm 22 will engage the spring 20 and force the catch 21 into disengaged position.

The hook and its guard are normally in the position shown in Fig. 1. If it is desired to move the draw-bar from engagement with the hook to uncouple the trailers, one of the handles 24 is grasped and turned so that catch 21 is moved to disengaged position. Then one of the handles 11 is grasped and the guard lifted to permit removal of the eye bar. If it is desired to hold the guard in open position, it is swung to the limit of its movement so that detent pin 14 engages the recess 19. The guard will then be held in its open position until the detent is forced out of the recess by pressing downwardly upon either of the handles 11. When it is desired to couple trailers together, the catch 21 is forced out of engaging position by turning one of the handles 24 and the draw-bar is pressed against the guard 10, the latter being lifted thereby and the eye moving into engagement with the hook. A handle 24 is then turned to release the catch, the guard having dropped by gravity to its position closing the hook.

What I claim is:

1. A coupling member comprising a hook, a guard for closing the mouth of said hook, said guard having a shaft secured thereto pivotally mounted on said hook and forming a handle for manipulating the guard, and a leaf spring carrying a catch disposed to engage the top of said guard and hold the latter in closed position.

2. A coupling member comprising a hook, a guard for closing the mouth of said hook, said guard having a shaft secured thereto pivotally mounted on said hook and forming a handle for manipulating the guard, a leaf spring on said hook having a catch disposed to engage the top of said guard, and manually operable means to engage said leaf spring and force said catch from engaging position.

In witness that I claim the foregoing I have hereunto subscribed my name this 29th day of June, 1921.

TOBIAS WEBER.